United States Patent [19]

Hermansen et al.

[11] Patent Number: 5,457,165

[45] Date of Patent: Oct. 10, 1995

[54] ENCAPSULANT OF AMINE-CURED EPOXY RESIN BLENDS

[75] Inventors: Ralph D. Hermansen, Northridge; Steven E. Lau, Los Angeles, both of Calif.

[73] Assignee: Hughes Aircraft Company, Los Angeles, Calif.

[21] Appl. No.: 928,885

[22] Filed: Aug. 12, 1992

Related U.S. Application Data

[63] Continuation-in-part of Ser. No. 504,211, Mar. 19, 1990, abandoned.

[51] Int. Cl.$^6$ .............................. C08L 63/00; C08L 77/06
[52] U.S. Cl. ................. 525/420.5; 525/423; 525/524; 525/113
[58] Field of Search ................. 525/420.5, 423, 525/524, 113

[56] References Cited

U.S. PATENT DOCUMENTS

| | | | |
|---|---|---|---|
| 3,875,106 | 4/1975 | Lazzaro | 523/445 |
| 4,181,645 | 1/1980 | Kinoshita | 523/400 |
| 4,260,700 | 4/1981 | Cassutt et al. | 523/400 |
| 4,515,912 | 5/1985 | Sayles | 523/456 |
| 4,758,638 | 7/1988 | Hickner et al. | 528/103 |

*Primary Examiner*—Robert E. Sellers
*Attorney, Agent, or Firm*—M. E. Lachman; M. W. Sales; W. K. Denson-Low

[57] ABSTRACT

Encapsulant compositions which provide both dry heat and humid heat stability comprise:

(a) a first liquid epoxy resin comprising either:
    (1) the diglycidyl ether of polyoxypropylene glycol; or
    (2) the diglycidyl ester of linoleic dimer acid;

(b) a second liquid epoxy resin comprising the diglycidyl ether of 1,4-butanediol, present in the amount of about 12 to 55 parts by weight of said composition; and (c) a stoichiometric amount of an epoxy resin curing agent selected from the group consisting of a flexibilized polyamine and a flexibilized polyamide.

6 Claims, No Drawings

5,457,165

ENCAPSULANT OF AMINE-CURED EPOXY RESIN BLENDS

This is a continuation-in-part of application Ser. No. 07/504,211, filed Mar. 19, 1990, now abandoned.

BACKGROUND OF THE INVENTION

1. Field of the Invention

The present invention relates generally to compositions used to encapsulate electronic devices. More particularly, the present invention relates to flexible epoxy compositions for use as encapsulants, which are designed to provide thermal and hydrolytic stability.

2. Description of the Background Art

In the fabrication of electronic devices and circuits, the electronic devices are protected from the adverse effects of the environment by filling the empty spaces between components on the device with a potting material which encapsulates these components. The electronic device must be protected from contact with anything in the environment, such as water or other contaminants, which would produce electrical shorting in the device. If the electronic device is used outdoors, such as in automotive, aircraft, marine, or building applications, the potting or encapsulant material must be stable enough to provide protection over extreme outdoor temperatures and humidity conditions. At elevated temperatures, the encapsulant material could liquefy, crack, shrink, expand, or become electrically conductive, any one of which would allow water or other contaminants to contact the device and produce short circuits. When the encapsulant is exposed to moisture, such as from humid air, the temperature at which the encapsulant breaks down is even lower. Consequently, such encapsulants must possess both thermal stability and hydrolytic stability.

Epoxy compounds have been widely used as adhesives, encapsulants and coatings for a variety of applications. Epoxy compounds typically have good insulating properties and excellent adhesion, and are easy to process. However, flexibilized epoxies usually have poor thermal stability, hydrolytic stability and mechanical properties; and consequently, have not been used for elastomeric applications. Rather, polyurethane or silicone potting compositions have been used for these applications. However, polyurethanes are more difficult to process due to their tendency to foam when in contact with moisture—containing surfaces. Silicones have the disadvantage of being poor adhesives and are also mechanically weak and costly.

Thus, a need exists in the electronics industry for a potting or encapsulant composition which provides thermal and hydrolytic stability while at the same time providing good insulation, good adhesion and good processing characteristics.

SUMMARY OF THE INVENTION

The general purpose of the present invention is to provide encapsulant compositions which produce thermal and hydrolytic stability, are insulative and adhesive, and have good processing characteristics. These compositions possess most, if not all, of the advantages of the above prior art compositions while overcoming their abovementioned significant disadvantages.

The above-described general purpose of the present invention is accomplished by providing an encapsulant composition comprising:

(a) a first liquid epoxy resin selected from the group consisting of:

(1) the diglycidyl ether of polyoxypropylene glycol; and (2) the diglycidyl ester of linoleic dimer acid;

(b) a second liquid epoxy resin comprising the diglycidyl ether of 1,4-butanediol, present in the amount of about 12 to 55 parts by weight of said composition; and (c) a stoichiometric amount of an epoxy resin curing agent selected from the group consisting of a flexibilized polyamine and a flexibilized polyamide. When the epoxy resins in this composition are cured by reaction with the curing agent, the cured product is thermally stable up to about 125° C. and is hydrolytically stable up to about 85° C. and 95 percent relative humidity. Alternatively, the composition may also include a castor oil plasticizer.

DESCRIPTION OF THE PREFERRED EMBODIMENTS

The encapsulant compositions of the present invention have been developed to provide both thermal and hydrolytic stability in the encapsulant, as well as good electrical insulating properties, good adhesion, flexibility, and ease of processing.

The compositions of the present invention are based on the use of a combination of selected epoxy resins and a curing agent which will provide a flexible product. The selection of the particular epoxy resins and the relative proportions thereof are critical in obtaining the desired thermal and hydrolytic stability as well as flexibility. The composition of the present invention comprises a first liquid epoxy resin which is either:

(a) the diglycidyl ether of polyoxypropylene glycol, such as DER 732 having an epoxy equivalent weight of about 320 or DER 736 having an epoxy equivalent weight of about 190, which may be obtained from Dow Chemical Company; or (b) the diglycidyl ester of linoleic dimer acid, such as EPON 871 having an epoxy equivalent weight of about 430, which is available from Shell Chemical Company.

Optionally, if the diglycidyl ether of polyoxypropylene glycol is used, a portion of it may be replaced with the diglycidyl ether of Bisphenol A, such as EPON 828, having an epoxy equivalent weight of about 185–192, which is commercially available from Shell Chemical Company.

The present composition also comprises a second liquid epoxy resin which is the diglycidyl ether of 1,4-butanediol such as Heloxy WC-67 having an epoxy equivalent weight of about 202, which is available from Wilmington Chemical. The second resin is present in the amount of about 12 to 55 parts by weight of the composition.

The curing agent used in the present composition is chosen to provide a flexible product from the selected epoxy resins. Known flexibilized polyamine or flexibilized polyamide curing agents for epoxy resins may be used. The preferred curing agents include, but are not limited to:

(a) the diprimary amine of dimer acid, such as Kemamine DP-3680 having an amine equivalent weight of about 170, produced by Witco Chemical Company of New York, N.Y.;

(b) an amine-terminated-butadiene acrylonitrile (ATBN) such as HYCAR 1300 16X having an amine equivalent weight of about 900 and a secondary amine value of about 62, available from B. F. Goodrich; and (c) a polyamide material, such as Versamid 140 available from Henkel Corporation of Minneapolis, Minn., which comprises 89 percent polyamide resin and 11 percent triethylenetetramine and has a specific gravity of 0.970. The curing agent is used in a stoichiometric amount sufficient to react with the epoxy groups. The weight ratio of the curing agent to the combination of the first and second epoxy resins has been varied within the range from about (0.93 to 1) to (1.13 to 1). A mixture of these polyamine and polyamide curing agents may optionally be used.

Optionally, the composition of the present invention may include a plasticizer such as castor oil, which is the glyceride of ricinoleic (octadecanoic) acid. The plasticizer helps to soften the product which would otherwise be too rigid, and helps to increase the hydrophobic content of the cured polymer.

When the composition of the present invention is used to pot a device, known potting procedures are used. The device is placed in a suitable holder. The two liquid epoxy resins are mixed together in predetermined proportions. The mixed epoxy resins and the curing agent are separately metered by volume onto and into the device to be encapsulated. Metering by volume is readily accomplished and closely approximates measuring proportions by weight. A ratio of epoxy resins to curing agent of about 1:1 by volume is desirable. The composition of the present invention is heated to 105°±5° C. for about 1 hour to cure the epoxy resin and encapsulate the device.

Compositions in accordance with the present invention were prepared as described in Examples 1–3 herein. Specimens of each composition were prepared by mixing the epoxy resins and curing agents, casting, and curing the resin for one hour at about 105° C. The color of the specimens was quantified by comparison to a Gardner color standard. A Shore-A Durometer test was performed as specified by the American Society for Test and Materials, in the standard "Indentation Hardness of Rubber and Plastics by Means of a Durometer" (ASTM D2240). Dry heat aging was conducted by exposing the specimens to 125° C. for seven days. Shore-A Durometer and Gardner color were monitored periodically and on the seventh day. Humid/heat aging was conducted by placing both sand-filled and unfilled specimens in a humidity chamber at 85° C. and 95% relative humidity. Durometer and weight change were monitored periodically up to seven days. These results are summarized in Table I where Formulations 1–3 are described in Examples 1–3, respectively. All of these formulations had good processing characteristics.

From the data in Table I it may be seen that the encapsulant compositions in accordance with the present invention can withstand seven days' exposure to 125° C. with minimal change in Shore Durometer and Gardner color. In addition, these compositions can withstand seven days' exposure at 85° C. and 95 percent relative humidity (RH) with

TABLE I

TEST RESULTS

| Parameter | Formulation* | | |
|---|---|---|---|
| | 1 | 2 | 3 |
| Brookfield Viscosity | 112 | 1400 | 1260 |
| Shore A Durometer | 67 | 62 | 82 |
| Gardner Color | 12 | approx. 10 | 9 |
| Dry Heat Stability (125° C.) | | | |
| Shore A | 75 after 7 days | 74 after 7 days | 99 after 7 days |
| Color | 25** | opaque | 19** |

TABLE I-continued

TEST RESULTS

| Parameter | Formulation* | | |
|---|---|---|---|
| | 1 | 2 | 3 |
| Humid Heat Stability (85° C., 95% RH) | | | |
| Shore A | 71 after 7 days | 73 after 7 days | 80 after 7 days |

*For composition of Formulations 1, 2, and 3, see respectively Examples 1, 2, and 3.
**Estimated.

minimal change in Shore Durometer, weight and shape. Thus, the present compositions are particularly well suited for potting devices which are exposed to an outdoor environment, such as in automotive vehicles, spacecraft, shipboard equipment, or land-based equipment.

Examples of practice of the present invention are as follows.

EXAMPLE 1

A preferred composition in accordance with the present invention was formulated as follows:

| | Parts by Weight |
|---|---|
| DER 736 (epoxy) | 50.0 |
| WC-67 (epoxy) | 50.0 |
| DP-3680 (curative) | 107.7 |

The amount of each epoxy resin may vary by about±5 percent. The ratio of the epoxy materials to the curative was 0.93:1. This formulation 1 was tested as previously discussed with regard to Table I.

DER 736 is flexible and provides hydrolytic stability in the cured product. The use of WC-67 in combination with DER 736 was found to improve the heat stability and mechanical properties of the cured material. It was also determined that WC-67 alone could not be used due to the greater rigidity of the cured material and exothermic heat of reaction.

EXAMPLE 2

A composition in accordance with the an alternative embodiment of the present invention was formulated as follows:

| Material | Parts by Weight |
|---|---|
| EPON 871 (epoxy) | 50.0 |
| WC-67 (epoxy) | 50.0 |
| Versamid 140 (curative) | 50.0 |
| Castor oil (plasticizer) | 37.5 |

The amount of each epoxy resin may vary by about±5 percent. The ratio of the epoxy materials to the curative was 1.13:1. This formulation 2 was tested as previously discussed with regard to Table I.

EPON 871 provides good electrical insulation and is flexible, but by itself is not hydrolytically stable. The use of WC-67 in combination with the EPON 871 was found to improve the humid heat stability of the cured product. The castor oil, which is a plasticizer, was used to help soften the product, and it was also found to improve the humid heat stability of the cured product.

EXAMPLE 3

A composition in accordance with the another alternative embodiment of the present invention, in which the first epoxy resin comprises a mixture of two resins, was formulated as follows:

| Material | Parts by Weight |
| --- | --- |
| EPON 828 (first epoxy) | 65.0 |
| DER 732 (first epoxy) | 17.5 |
| WC-67 (second epoxy) | 17.5 |
| DP-3680 | 85.0 |
| ATBN | 15.0 |

The amount of each epoxy resin may vary by about ±5 percent. The ratio of the epoxy materials to the curative was 1:1. This formulation 3 was tested as previously discussed with regard to Table I.

EPON 828 alone results in a rigid cured product. In the present composition, the amount of EPON 828 was maximized to improve both heat and hydrolytic stability, while being kept sufficiently low so that the other epoxy materials could flexibilize the cured product. The ATBN improves both the heat and hydrolytic stability, as well as the adhesion of the cured product. However, the amount of ATBN used must be limited due to its high viscosity. In addition, this composition was found to have exceptionally good adhesion, particularly to rubber and plastic components.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein, but is only limited by the following claims.

What is claimed is:

1. A flexible, electronic device encapsulant composition for electronic devices consisting essentially of the cured reaction product of:
   (a) a first liquid epoxy resin selected from the group consisting of:
      (1) the diglycidyl ether of polyoxypropylene glycol; and
      (2) the diglycidyl ester of linoleic dimer acid;
   (b) a second liquid epoxy resin comprising the diglycidyl ether of 1,4-butanediol wherein said second epoxy resin is present in the amount of about 12 to 55 parts by weight of said composition; and
   (c) a stoichiometric amount of an epoxy resin curing agent selected from the group consisting of the diprimary amine of dimer acid, an amine-terminated butadiene acrylonitrile, a mixture thereof, and a mixture of polyamide resin and triethylenetetramine wherein the cured product formed upon the reaction of said curing agent and said first and second epoxy resins encapsulates said electronic devices, is thermally stable up to about 85° C. and 95 percent relative humidity to thereby provide protection of said electronic devices from the effects of said temperatures and said relative humidity.

2. An encapsulant composition as set forth in claim 1 wherein:
   (a) said first epoxy resin comprises the diglycidyl ether of polyoxypropylene glycol, and is present in the amount of about 50±5 parts by weight of said composition;
   (b) said second epoxy resin is present in the amount of about 50 parts±5 parts by weight of said composition;
   (c) said curing agent comprises the diprimary amine of dimer acid and is present in the amount of about 108 parts by weight of said composition.

3. An encapsulant composition as set forth in claim 1 wherein:
   (a) said first epoxy resin comprises a mixture of said diglycidyl ether of polyoxypropylene glycol and the diglycidyl ether of Bisphenol A; and
   (b) said curing agent comprises a mixture of said diprimary amone of dimer acid and said amine-terminated butadiene acrylonitrile.

4. An encapsulant composition as set forth in claim 3 wherein:
   (a) said diglycidyl ether of polyoxypropylene glycol is present in the amount of about 17.5±5 parts by weight of said composition;
   (b) said diglycidyl ether of Bisphenol A is present in the amount of about 65±5 parts by weight of said composition;
   (c) said second epoxy resin is present in the amount of about 17.5±5 parts by weight of said composition; and
   (d) said curing agent comprises a mixture of the diprimary amine of dimer acid in the amount of about 85 parts by weight of said composition and an amine-terminated butadiene acrylonitrile in the amount of about 15 parts by weight of said composition.

5. An encapsulant composition as set forth in claim 1 further consisting essentially of castor oil as a plasticizer.

6. An encapsulant composition as set forth in claim 5 wherein:
   (a) said first epoxy resin comprises the diglycidyl ester of linoleic dimer acid and is present in the amount of about 50±5 parts by weight of said composition;
   (b) said second epoxy resin is present in the amount of about 50 parts±5 parts by weight of said composition;
   (c) said curing agent comprises said mixture of polyamide resin and triethylenetetramine and is present in the amount of about 50 parts by weight of said composition; and
   (d) said castor oil is present in the amount of about 37.5 parts by weight of said composition.

\* \* \* \* \*